Patented Feb. 29, 1944

2,343,053

UNITED STATES PATENT OFFICE 2,343,053

GLYCEROL-ETHERS AND THEIR MANUFACTURE

Adolf Grün, Basel, Switzerland, assignor to the firm J. R. Geigy A. G., Basel, Switzerland No Drawing. Application December 9, 1940, Serial No. 369,354. In Switzerland December 23, 1939

2 Claims. (Cl. 260—615)

It has been found that glycerol-ethers which contain at least two ether radicals possess valuable therapeutic properties, if they comprise at least one olefinic or one substituted cyclic ether radical, whereby however at least two of the introduced ether radicals must be different from each other. The ether groups can also be brominated.

The production of these glycerol-di- and -triethers takes place in the usual manner known in the manufacture of glycerol-ethers, that is especially by heating glycerol halogen hydrines with the corresponding alcoholates which, if desired, may also be mixed. The use of the epi-compounds of the glycerol or of the mono- or di-ethers or the halogen hydrines of the said compounds may also come into consideration. The introduction of bromine can be effected by using brominated reaction components or by brominating the final products, whereby, of course, by partial or complete debromination under splitting of hydrobromic acid, unsaturated ether groups can also be produced.

It is already known that glycerol-triethyl ether shows no hypnotic effect upon the human organism, but that, on the contrary, glycerol-trialkyl-ethers which contain two or three saturated alkyl groups different from each other possess somniferous properties. The same, however, are so weak that the said compounds could not find any practical use. Dehydrating products of the glycerol, such as for example the anhydride of the diglycerol possesses only on intravenous application a very short somniferous effect with respect to rabbits. Diethyline which in the pharmacology is used as solvent for camphor, causes, when applied to mammalia, "a more or less strongly marked state of narcosis." Alone, however, it has hitherto never been used.

It is therefore the more surprising that the glycerol-di- and -triethers obtained according to the present invention possess an excellent therapeutic effect; this fact could neither be found in the literature nor could it be foreseen.

The present invention is illustrated but not limited by the following examples, the parts being by weight unless otherwise stated.

EXAMPLE 1

*1-ethoxy-3-propenoxy-propanol-2*

To a solution of monoethyline (or monomethyline) in an about tenfold quantity of benzene there is gradually added the calculated quantity of sodium, whereby the temperature of at first about 40° C. is finally raised to boiling. The solution or swelling of the alcoholate which is then cooled down to 30–40° C. is intermixed with a small excess of allylbromide, then the mixture thus obtained is stirred for several hours without heating, then at 75–80° C. over night, and filtered from the potassium bromide which has separated out in the calculated quantity, whereupon the benzene and the allylbromide in excess is fractionated from the reaction product, i. e. from the 1-ethoxy-3-propenoxy-propanol-2. When purified by distillation in vacuo, the reaction product is obtained in a yield of 85–90 per cent of the theory, B. P. at 20 mm. 106–108° C.

If the product is once more subjected to the same reaction order, that is converted with sodium into the alcoholate and then treated with allylbromide, there results the 1-ethoxy-2:3-dipropenoxy-propane. In the same manner, instead of the second allyl group, another alkenyl or isoalkyl can be introduced thereinto.

EXAMPLE 2

*1-ethoxy-3-(o-methoxyphenoxy)-propanol-2*

Epiguaiacoline made from epichlorhydrine and potassium guaiacolate is heated up to about 180° C. with absolute alcohol in excess in the autoclave for 10 hours, the alcohol is then fractionated off and the remaining raw product purified by distillation. Thus the 1-ethoxy-3-(o-methoxy-phenoxy)-propanol-2 is obtained in a yield of more than 90 per cent of the theory in form of a moderately viscous liquid which is clear as water and practically odorless; B. P. at 17 mm. 176–177° C.

EXAMPLE 3

*1-ethoxy-3-brompropenoxy-propanol-2*

A solution of the sodium compound of mono-ethyline in benzene prepared according to Example 1, is mixed with the calculated quantity of 2:3-dibrompropene

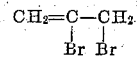

thereupon heated for several hours at 40–60° C. and then for 12 hours at 80° C. By separation of the sodium bromide and the benzene the product, i. e. the 1-ethoxy-3-brompropenoxy-propanol-2, is isolated. It constitutes a slightly yellow colored liquid; B. P. at 15 mm. 135–140° C.

The same compound can also be obtained from allylethyline prepared according to Example 1 by addition of bromide and subsequent splitting off of a molecule of hydrobromic acid. Splitting off of two molecules of HBr leads to the ethoxy-propargyloxy-propanol.

Example 4

1-isobutyloxy-3-propenoxy-propanol-2

Epichlorhydrine is treated in the autoclave for 10–12 hours at about 140° C. with isobutyl alcohol in excess, whereupon the alcohol is expelled. Thus there is obtained the glycerol-monochlorhydrine-isobutylether; B. P. at 16 mm. 94–97° C. The latter is introduced into a solution of the calculated quantity of sodium in 15 parts of absolute allylalcohol and the mixture, together with the common salt separated out already while mixing the liquids, is heated for several hours up to 170° C. in the autoclave.

The usual working up by filtering off the salt, expelling the alcohol and so on gives with a good yield the 1-isobutoxy-3-propenoxy-propanol-2, which constitutes a limpid moveable liquid boiling at 225–227° C.

Furthermore one also succeeds to make the glycerol-monochlorhydrine-monoallylether (B. P. at 16 mm. 102–104° C.) from epichlorhydrine and allylalcohol and to convert the said glycerol-ether into the allylisobutyline by means of sodium isobutylate. The alkylation in one operation by causing glycerol-α-dichlorhydrine or -α-dibromhydrine to react with a mixture of sodium allylate and sodium isobutylate runs in a less smooth manner.

Example 5

1-isobutyloxy-3-bromopropenoxy-propanol-2

160 parts of dry bromine diluted with the same volume of carbon tetrachloride are allowed to flow very slowly at 0–3° C. into 190 parts of allyl-isobutyline which has been dissolved in 250 parts of dry carbon tetrachloride, until no more bromine is absorbed. (1–1.5 per cent remain unconsumed.) The solution is shaken out with some bisulfite, then with bicarbonate, and is dried, whereupon the carbon tetrachloride is distilled off in vacuo. The residue is dissolved in half the volume of alcohol and heated up to 80–100° C. for 1 hour with a solution of 66 parts of potassium hydroxide in 40 parts of water and 300 parts of alcohol and concentrated. From the remaining mixture of liquid reaction product and potassium bromide (120 parts, calculated 119 parts of BrK) the first one is isolated by decanting and subsequent washing with ether, concentrating the solution and fractionating the same. The 1-isobutyloxy-3-bromopropenoxy-propanol-2 is a light-yellow, moderately viscous liquid of boiling point 190–191° C. at 6 mm. pressure.

Similar compounds are the 1-isopropyloxy-, 1-n- or isoamyloxy ethers.

Example 6

1-propenoxy-3-phenoxy-propanol-2

Epiphenyline is heated up to 180° C. for 8 hours in the autoclave with a greater excess of absolute allylalcohol, the excess of alcohol is then fractionated off and the product is rectified in vacuo. The product isolated with a good yield and having the boiling point of 167–169° C. at a pressure of 16 mm. is according to its composition and reactions the pure 1-propenoxy-3-phenoxy-propanol-2. It combines additively the calculated quantity of bromine, thus forming the 1-(β,γ-dibromopropyloxy)-3-phenoxy-propanol-2.

By causing alcoholic potassium hydroxide to react therewith, the dibromo-compound, particularly rapidly on heating, splits off a molecule of hydrobromic acid and gives thus a bromallyl derivative, i. e. the 1-β-bromopropenoxy-3-phenoxy-propanol-2.

Example 7

1-tetrahydrofurfuryloxy-3-phenoxy-propanol-2

As the epiphenyline combines additively pure aliphatic alcohols, aromatic and hydroaromatic alcohols, it adds also heterocyclic-substituted alcohols such as furfuryl or tetrahydrofurfuryl alcohol.

Thus, for example, 1 part of epiphenyline is heated with 3 parts of tetrahydrofurfuryl alcohol, B. P. at 13 mm. 70–71° C., in the autoclave for 10 hours up to 200–220° C. and the unconsumed excess of alcohol as well as the reaction product, the 1 - tetrahydrofurfuryloxy - 3 - phenoxy-propanol-2, a bright liquid of boiling point 200–210° C. at 13 mm., are fractionated from the reaction mixture.

Instead of epiphenyline its substitution products, epiarylines of different kind, may also be subjected to reaction, thus for example epi-o-, -m-, -p-cresyline, epi-1:3:4- or -1:3:5-xylenylines, furthermore alkoxy derivatives such as epiguaiacoline (see Example 2), epiaiacoline and the like, then α- and β-epinaphthyline, the corresponding products from the tetrahydronaphthols and so on.

Instead of the tetrahydrofurfuryl alcohol other heterocyclic radicals can be introduced, especially those with oxygen as hetero atom, such as for example hydroxypyrane- or hydroxyalkylpyrane radicals (like the dimethylhydroxymethylpyrane radical), but also radicals with two hetero atoms in the ring such as they are present in the derivatives of the dioxane and dioxol. Thus according to the indications of the above examples the following compounds may easily be obtained: 1-propenoxy-3-dioxolylmethoxy-propanol-2 of the following formula:

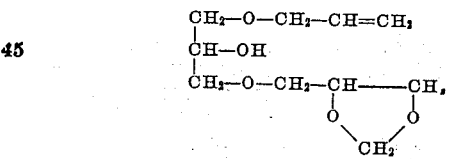

which is an easily movable odorless liquid, B. P. at 3.5 mm. 184–186° C., furthermore 1-(2′-methoxyphenoxy)-3-dioxolylmethoxy-propanol-2 of the formula:

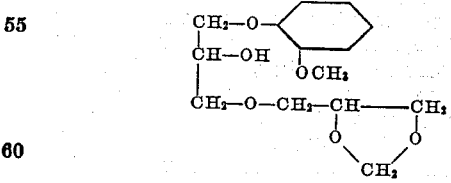

being a viscous wine-yellow liquid, B. P. at 13 mm. 228–231° C.

The heterocyclic alcohol required for the above two compounds is obtained by hydrogenation of the so-called Delépine-aldehyde.

Instead of simple alcohols their substitution products, for example halogenated alcohols, that is halogen hydrines, ether alcohols such as monoethyl- or monoallyl ether of the ethylene glycol, polyvalent alcohols and so on can also be caused to react with epiarylines.

As a further unsaturated radical the radical corresponding to the buten-3-ol-1 comes into question for the manufacture of glycerol ethers according to the present invention; this unsaturated alcohol is easily obtainable by dehydration from butanediol-1:3. The compounds thus obtainable possess in general the same properties as the analogous propene compounds with the exception that their boiling point is always somewhat higher.

What I claim is:

1. The unsulfated glycerol-di-ethers of the following general formula

wherein X means a radical selected from the group consisting of alkoxy-substituted aromatic radicals of the benzene series and Y any organic radical different from X, the new products being valuable therapeutics.

2. The glycerol-ether of the following formula

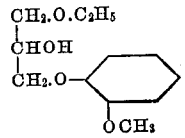

being a colorless, odorless liquid of low viscosity and of the boiling point 176–177° C. at 17 mm.

ADOLF GRÜN.